US007528642B2

(12) United States Patent
Ishigaki

(10) Patent No.: US 7,528,642 B2
(45) Date of Patent: May 5, 2009

(54) SEMICONDUCTOR INTEGRATED CIRCUIT DEVICE AND METHOD OF OUTPUTTING SIGNALS ON SEMICONDUCTOR INTEGRATED CIRCUIT

(75) Inventor: Takeshi Ishigaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 10/586,951

(22) PCT Filed: Aug. 15, 2005

(86) PCT No.: PCT/JP2005/015173

§ 371 (c)(1),
(2), (4) Date: Jul. 25, 2006

(87) PCT Pub. No.: WO2006/100792

PCT Pub. Date: Sep. 28, 2006

(65) Prior Publication Data

US 2007/0296471 A1 Dec. 27, 2007

(51) Int. Cl.
*G06F 1/04* (2006.01)
*H03K 3/00* (2006.01)

(52) U.S. Cl. .................. 327/293; 327/291; 327/565

(58) Field of Classification Search ................ 327/595, 327/291–299

See application file for complete search history.

(56) References Cited

U.S. PATENT DOCUMENTS

| 5,617,458 | A | 4/1997 | Jones et al. |
| 6,118,314 | A * | 9/2000 | Arnould et al. ............ 327/141 |
| 6,185,691 | B1 | 2/2001 | Gandhi et al. |
| 6,339,235 | B1 | 1/2002 | Takata |
| 2003/0020524 | A1 | 1/2003 | Ehmann |

FOREIGN PATENT DOCUMENTS

IT          1 055 311 B      12/1981

OTHER PUBLICATIONS

International Search Report for PCT/JP2005/015173.

* cited by examiner

*Primary Examiner*—Kenneth B Wells
*Assistant Examiner*—Daniel Rojas
(74) *Attorney, Agent, or Firm*—Sprinkle IP Law Group

(57) ABSTRACT

A semiconductor integrated circuit device includes a semiconductor substrate having a first area. A first counter is provided in the first area, cyclically counts and outputs a first counter signal as a result of counting. A global reset circuit is provided on the semiconductor substrate and outputs a global reset signal. A first local reset circuit is provided in the first area and outputs a first local reset signal upon receiving the first counter signal of a set value after supplied with the global reset signal. A first circuit is provided in the first area and supplied with the first local reset signal.

4 Claims, 14 Drawing Sheets

SEMICONDUCTOR INTEGRATED CIRCUIT DEVICE AND METHOD OF OUTPUTTING SIGNALS ON SEMICONDUCTOR INTEGRATED CIRCUIT

CROSS-REFERENCE TO RELATED APPLICATIONS

This application is based upon and claims the benefit of priority from prior Japanese Patent Application No. 2005-079562, filed Mar. 18, 2005, the entire contents of which are incorporated herein by reference.

TECHNICAL FIELD

The present invention relates to a semiconductor integrated circuit device and a method of outputting signals on a semiconductor integrated circuit, and for example, to the supply of a signal to a plurality of areas on a semiconductor substrate.

BACKGROUND ART

Functional areas on an integrated circuits (IC) chip operate in synchronism with one another in accordance with a clock signal. The clock signal is distributed to the functional areas at the same timing using a method called clock mesh or clock tree. The clock mesh method involves arrangement of wiring for the clock signal in a mesh form on the IC chip. The clock tree method involves provision of a plurality of medium areas each consisting of a group of a plurality of small areas and can receive a signal simultaneously. A relay circuit provided in each medium area supplies a signal to the small areas simultaneously.

With the recently improved functions of IC chips, it may be necessary that the functional areas operate at different clock frequencies. In this case, with both the clock mesh and tree methods, clock signal wiring is required for each of the clocks with different frequencies.

Further, the increased speeds of ICs have also increased the frequencies of clock signals. Thus, at present, the time required for one cycle (cycle time) of a clock signal is very short. In addition, with the improvement of techniques for manufacturing IC chips, semiconductor elements provided on the IC chip have reduced sizes. Thus, there is a long distance between the functional areas. This increases the time required for a signal to move from one position to another on the IC chip.

With the reduction in the cycle time of a clock signal and the increase in the distance between two positions, it has become difficult to deliver a certain kind of signal to positions on the IC chip simultaneously. Such signals include a reset signal. The reset signal must reach all the parts of the IC chip simultaneously. However, for the above reasons, a plurality of cycles of the clock signal may be required for the reset signal to reach a certain position. Thus, the arrival time of the reset signal may vary depending on the position on the IC chip. This may cause the functional areas to shift to an operative state at different timing, thus leading the IC chip to malfunction.

To solve this problem, it is possible to provide a reset signal having a tree structure or to insert the same number of flip-flops connected in series, in each path for the reset signal to the corresponding functional area. A method for providing a reset signal having a tree structure is the same as the clock signal. This requires the setting of the number and positions of relay circuits for an IC chip. Thus, a very long time is required to design both the clock and reset signals having a tree structure.

With the method of inserting flip-flops, the number of flip-flops in each reset signal path is set equal to that in the reset signal path via which the reset signal requires the longest time to reach the functional area. This allows the reset signal to reach the functional areas simultaneously. However, this method requires the prediction of the time needed for the reset signal to reach each functional area without using any flip-flops and the insertion of a number of flip-flops based on the predicted time. Consequently, it is difficult to design the structure. Further, this method requires a large number of flip-flops unnecessary for the essential operation of the IC chip to increase manufacturing costs.

DISCLOSURE OF INVENTION

According to a first aspect of the present invention, there is provided a semiconductor integrated circuit comprising: a semiconductor substrate having a first area; a first counter provided in the first area, cyclically counting and outputting a first counter signal as a result of counting; a global reset circuit provided on the semiconductor substrate and outputting a global reset signal; a first local reset circuit provided in the first area and outputting a first local reset signal upon receiving the first counter signal of a set value after supplied with the global reset signal; and a first circuit provided in the first area and supplied with the first local reset signal.

According to a second aspect of the present invention, there is provided a semiconductor integrated circuit comprising: a semiconductor substrate having a first area and a second area; a plurality of counters one of which is provided in the first area and the second area and which cyclically count a same value at a same timing in synchronism with a first clock signal and output a counter signal as a result of counting; a first clock circuit provided in the first area, supplied with the counter signal and outputting a second clock signal having a phase which becomes zero every time the counter signal counts n times (n being a natural number); a first circuit provided in the first area and operating in synchronism with the second clock signal; a second clock circuit provided in the second area, supplied with the counter signal and outputting a third clock signal having a phase which becomes zero every time the counter signal counts m times (m being a natural number different from n); and a second circuit provided in the second area, operating in synchronism with the third clock signal and supplying the first circuit with data when the counter signal has a value equal to a common multiple of n and m.

According to a third aspect of the present invention, there is provided a semiconductor integrated circuit comprising: a semiconductor substrate having a first area and a second area; a plurality of counters one of which is provided in the first area and the second area and which cyclically count a same value at a same timing and output a counter signal as a result of counting; a first circuit provided in the first area, supplied with the counter signal and outputting a first signal when the counter signal has a first value; and a second circuit provided in the second area, supplied with the counter signal and supplying the first circuit with a second signal containing information on a value of the counter signal obtained upon reception or the first signal.

According to a fourth aspect of the present invention, there is provided a semiconductor integrated circuit comprising: a semiconductor substrate having a first area and a second area; a first counter provided in the second area, cyclically counting in synchronism with the first clock signal and outputting a first counter signal as a result of counting; a first clock circuit supplied with the first counter signal and the first clock signal and outputting a second clock signal having a phase which becomes zero when supplied with the first counter signal with a value of n (n being a natural number) and the first clock signal in a first state; and a first circuit provided in the second area and operating in synchronism with the second clock signal.

According to a fifth aspect of the present invention, there is provided a semiconductor integrated circuit comprising: outputting a first counter signal as a result of cyclic counting from a first counter provided in a first area on a semiconductor substrate; outputting a global reset signal from a global reset circuit provided on the semiconductor substrate; outputting a first local reset signal from a first local reset circuit provided in the first area to a first circuit provided in the first area when the first local reset circuit receives the first counter signal of a set value after supplied with the global reset signal.

BEST MODE FOR CARRYING OUT THE INVENTION

Figure 1:
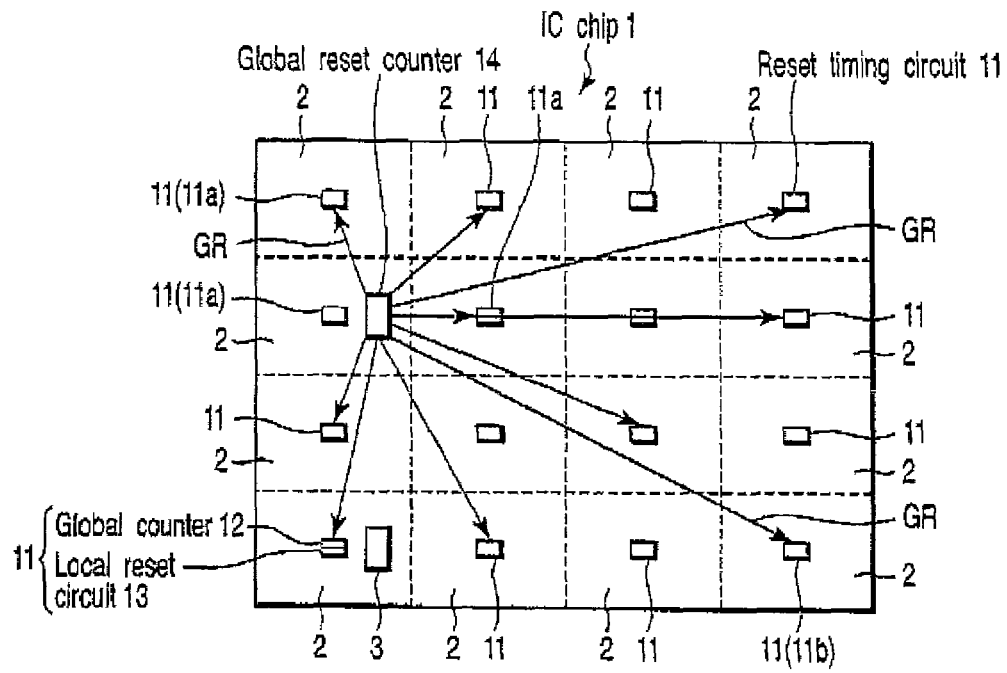
FIG. 1 is a diagram showing a semiconductor integrated circuit device according to a first embodiment of the present invention.

Embodiments of the present invention will be described below with reference to the drawings. In the description below, components having substantially the same functions and configurations are denoted by the same reference numerals. Duplicate descriptions will be given only when required.

First Embodiment

Figure 2:
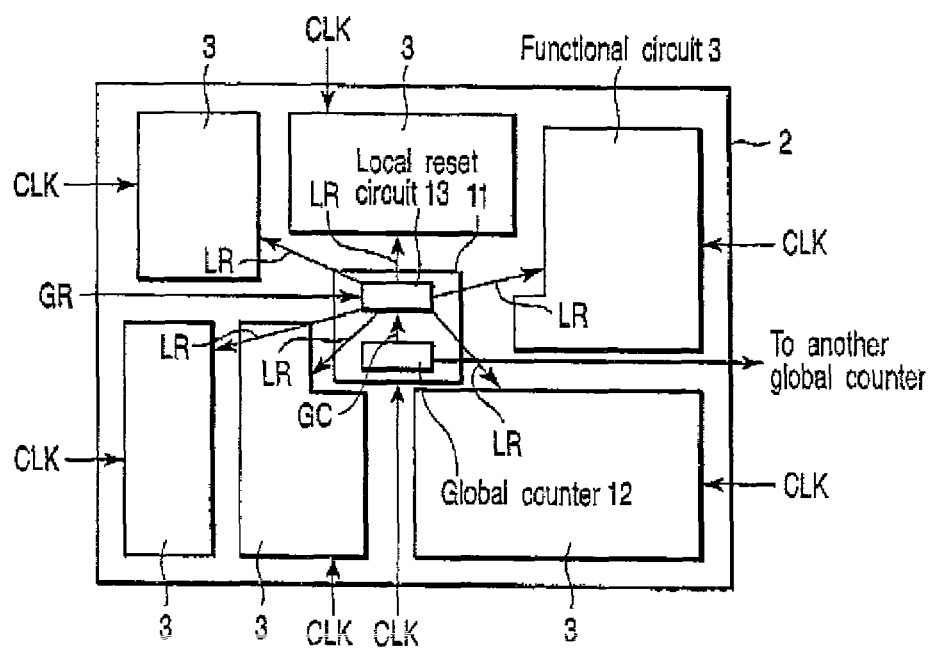
FIG. 2 is a block diagram showing each area according to the first embodiment in further detail.

A first embodiment relates to the supply of a reset signal on an IC chip. FIG. 1 is a diagram schematically showing a main part of a semiconductor integrated circuit device according to the first embodiment of the present invention. As shown in FIG. 1, an IC chip (semiconductor substrate) 1 is divided into some areas 2. FIG. 2 is a block diagram showing one area 2 in further detail. Each area has the arrangement shown in FIG. 2 and described below.

As shown in FIGS. 1 and 2, one or more functional circuits 3 are provided in each area 2. Each of the functional circuits 3 performs predetermined operations, signal processing, information storage, and the like. The functional circuit 3 is composed of analog elements logic circuits, a memory, and the like.

Further, each area 2 is provided with a reset signal timing section 11. The reset timing circuit 11 has a global counter 12 and a local reset circuit 13. One of the areas 2 is provided with a global reset circuit 14 that instructs each functional circuit 3 to be reset. The global reset circuit 14 supplies a global reset signal GR to a reset timing circuit 11 in each area 2.

A common clock signal CLK is supplied to each functional circuit 3, the global counter 12, and the local reset circuit 13 at the same timing. Any method is available for supplying the clock signal CLK to the functional circuits 3 on the IC chip 1 at the same timing. However, a typical one of the methods will be described below in brief. The method for distributing the clock signal CLK does not limit the contents of the present embodiment. Any technique may be used to provide the clock signal CLK to reach the functional circuits 3 at the same timing.

Figure 3:
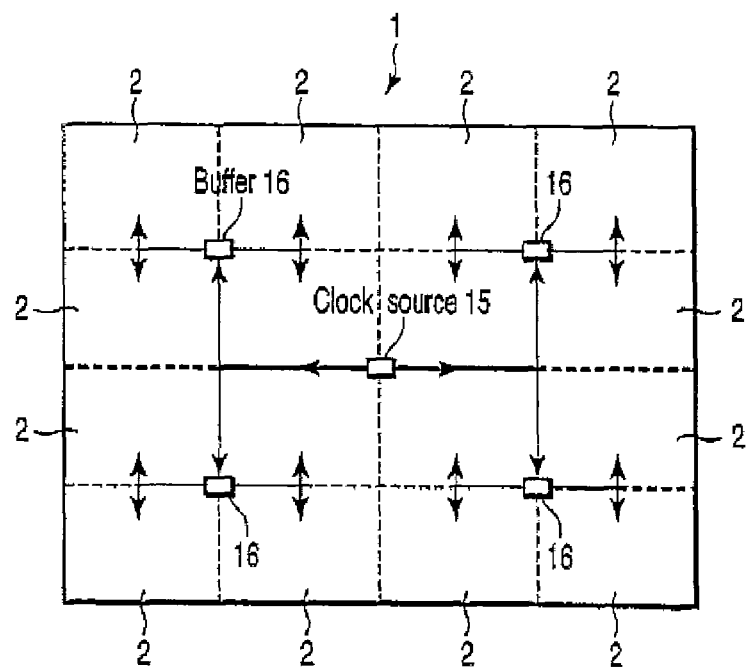
FIG. 3 is a block diagram showing a method for distributing a clock signal.

FIG. 3 is a diagram showing a method for distributing the clock signal CLK. The IC chip 1 has a clock source 15. The IC chip 1 is divided into some medium areas each consisting of an appropriate number of areas 2. Each medium area is provided with a buffer 16. The clock source 15 supplies the clock signal CLK to the buffers 16 at the same timing. Each buffer 16 supplies the provided clock signal CLK to each functional circuit 3 in the medium area to which the buffer 16 belongs. The arrangement of the medium area and the position of the clock source 15 are determined so that the clock signal CLK from the clock source 15 reaches all the buffers 16 without delay (or within one cycle of the clock signal CLK; this also applies to the description below). The buffer 16 is appropriately positioned to allow the signal from the buffer 16 to reach the flip flops in all the functional circuits 3 in each medium area without delay. By appropriately setting the number of areas 2 constituting the medium area and the configurations of the clock source 15 and buffer 16, the clock signal CLK can be supplied to all the functional circuits 3 simultaneously.

Figure 4:
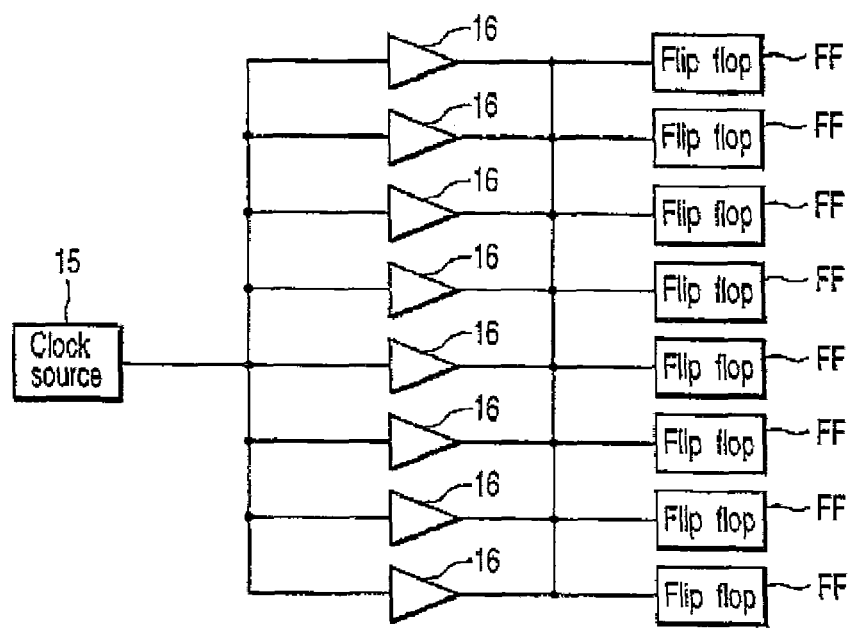
FIG. 4 is a circuit diagram showing the method for distributing a clock signal.

Alternatively, the method called clock mesh may be adopted. As shown in FIG. 4, in the clock mesh, the signal paths from the clock source 15 to the functional circuits 3 are connected together immediately before connection nodes to the flip flops FF in the functional circuit 3. Thus, although the clock signal paths ideally have the same length, the timing gap for the clock signal to reach the functional circuits 3 is smaller than in FIG. 3 even if the clock signal paths have different lengths.

As shown in FIG. 1, a global reset circuit 13 is provided in one of the areas 2. The global reset circuit 13 supplies each reset signal timing circuit 11 with the global reset signal GR instructing the corresponding functional circuit 3 to be reset. A path for the global reset signal GR is composed of normal wiring even though delay occurs depending on where the destination of the global reset signal GR is.

The global counters 12 are connected together. Each of the global counters 12 counts in accordance with the timing of the clock signal CLK and outputs a resultant counter signal GC. In normal operations, all the global counters 12 must count the same value. This can be achieved using, for example, the following method. First, when a power supply to the IC chip 1 starts, the value in the reference global counter 12 is referenced by the adjacent (second) global counter 12 to have the same value as the reference global counter 12. Then, the adjacent third global counter 12 references the value in the second global counter 12 to set its value equal to that in the second global counter 12. The above operation is sequentially performed until the values in all the global counters 12 are equal.

Each local reset circuit 13 is supplied with the counter signal GC and the global reset signal GR. The local reset circuit 13 outputs a local reset signal LR in accordance with a procedure described below.

Figure 5:
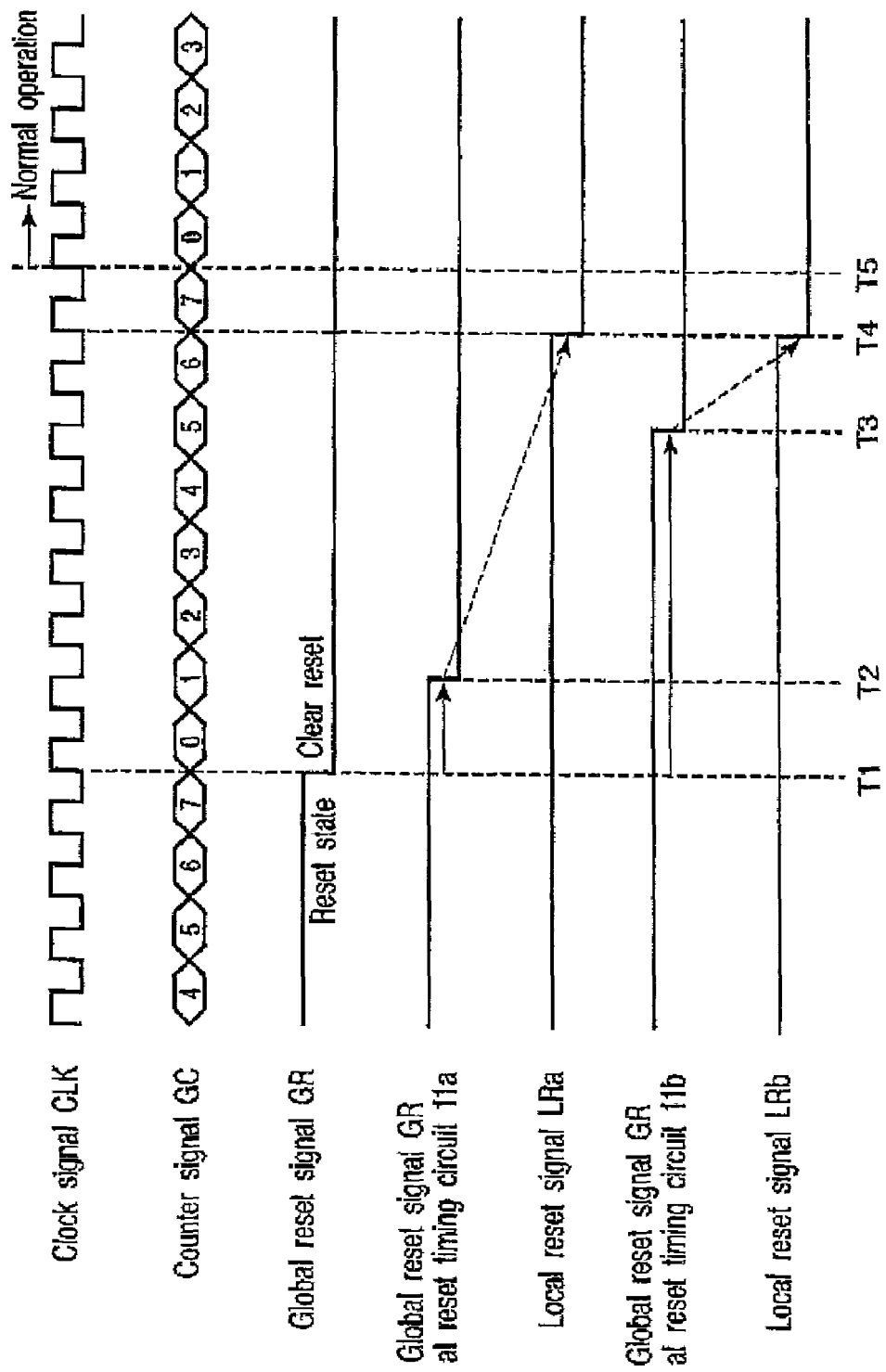
FIG. 5 is a timing chart showing waveforms for main parts of the first embodiment.

FIG. 5 is a timing chart showing waveforms for main parts of the semiconductor integrated circuit device according to the first embodiment. FIG. 5 shows operations related only to a reset timing circuit 11a close to the global reset circuit 14, shown in FIG. 1, and a reset timing circuit 11c furthest from the global reset circuit 14. However, all the other reset timing circuits 11 operate in accordance with a similar rule.

As shown in FIG. 5, the global counters 12 in all the areas 2 count the same value at the same timing. The global counter 12 keeps cyclic counting. In FIG. 5, by way of example, the numbers 0 to 7 are repeatedly counted (8 cycles). Description will be given later of a method for determining these numbers.

With reference to the value of the counter signal GC, the global reset circuit 14 outputs the global reset signal GR at a time T1 when the value in the global counter 12 becomes zero. The global reset signal GR reaches each reset timing circuit 11 (local reset circuit 13) via the signal path to it.

The signal paths between the reset timing circuits 11 and the global reset circuit 14 have different lengths. Thus, the global reset signal GR reaches the reset timing circuit 11a at a time T2 when the value in the global counter 12 is 1. The global reset signal GR reaches the reset timing circuit 11b at a time T3 when the value in the global counter 12 is 5. The global reset signal GR reaches all the reset timing circuits 11 at least before the global counter 12 counts the value 5.

The local reset circuits 13 do not immediately output the local reset signal LR after receiving the global reset signal GR. Subsequently, all the local reset circuits 13 observe the value of the counter signal GC and output the local reset signal LR (LRa, LRb) at a time T4 when the value becomes 7. Then, the functional circuits 3 simultaneously receive the local reset signal LR at a time T5 to clear the resetting.

The local reset circuit 13 may have any configuration as long as it performs the operations described in the present embodiment. However, the local reset circuit 13 is typically implemented as described below. The period of the global counter 12 is 8 in the above example. Accordingly, the local reset circuit 13 is supplied with the counter signal GC consisting of 3 bits. Then, in the eighth cycle of the global counter 12, the local reset signal LR is output. Consequently, the local reset circuit 13 latches the global reset signal GR and outputs the latched signal when supplied with the counter signal GC "111". The local reset circuit 13 must have a circuit configuration that can realize the above operations.

Now, description will be given of the timings for the signals and the rule for the setting of the range of the area 2. In the above description, the local reset signal LR is output when the value in the global counter 12 is 7. The time amount needed for the local reset signal LR to be output should be longer than maximum time amount required for the global reset signal GR to reach the reset timing circuit 11. This enables all the local reset circuits 13 to output the local reset signal LR simultaneously after receiving the global signal GR.

The range of each area 2 is set using as a boundary, the position (functional circuit 3) which the reset signal LR from the reset timing circuit 13 in the area 2 reaches in one cycle of the global counter 12. This enables all the functional areas 3 to start operations at the beginning of a cycle immediately after receiving the local reset signal LR.

In the semiconductor integrated circuit device according to the first embodiment of the present invention, the areas 2 have the respective global counters 12 that count the same value at the same timing and the respective local reset circuits 13 that outputs a local signal when the global counter 12 exhibits a predetermined value after receiving the global reset signal GR. Thus, even if the global reset signal GR reaches the local reset circuits 13 at different times, the local reset circuits 13 can output the local reset signals LR simultaneously. Since the local reset signals LR reach the functional circuits 3 within one cycle of the global counter 12, all the functional circuits can be reset simultaneously.

Second Embodiment

A second embodiment relates to timings for the transmission and reception of signals to and from the functional circuit 3 when the clock frequency varies with the areas 2.

Figure 6:
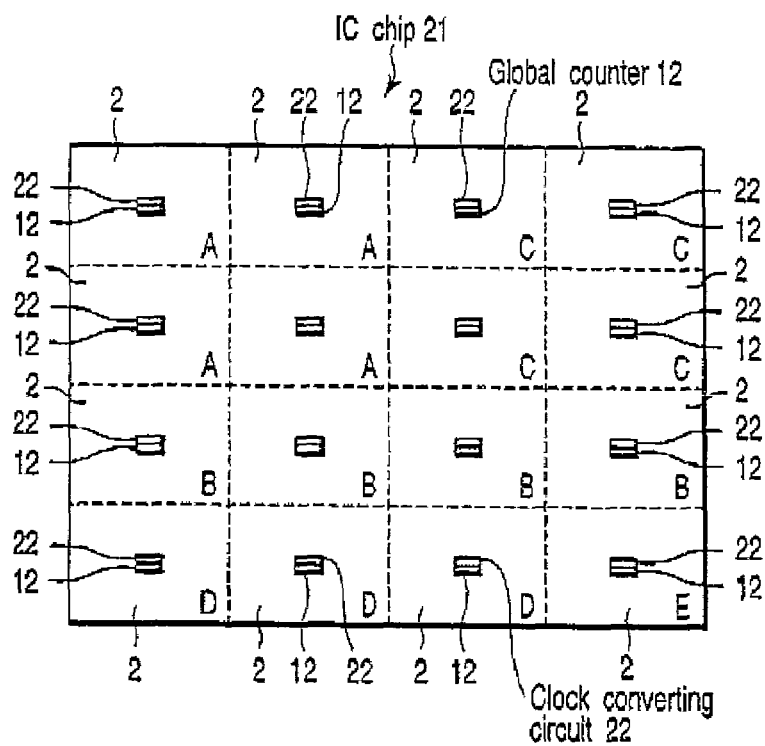
FIG. 6 is a diagram showing a semiconductor integrated circuit device according to a second embodiment of the present invention.
Figure 7:
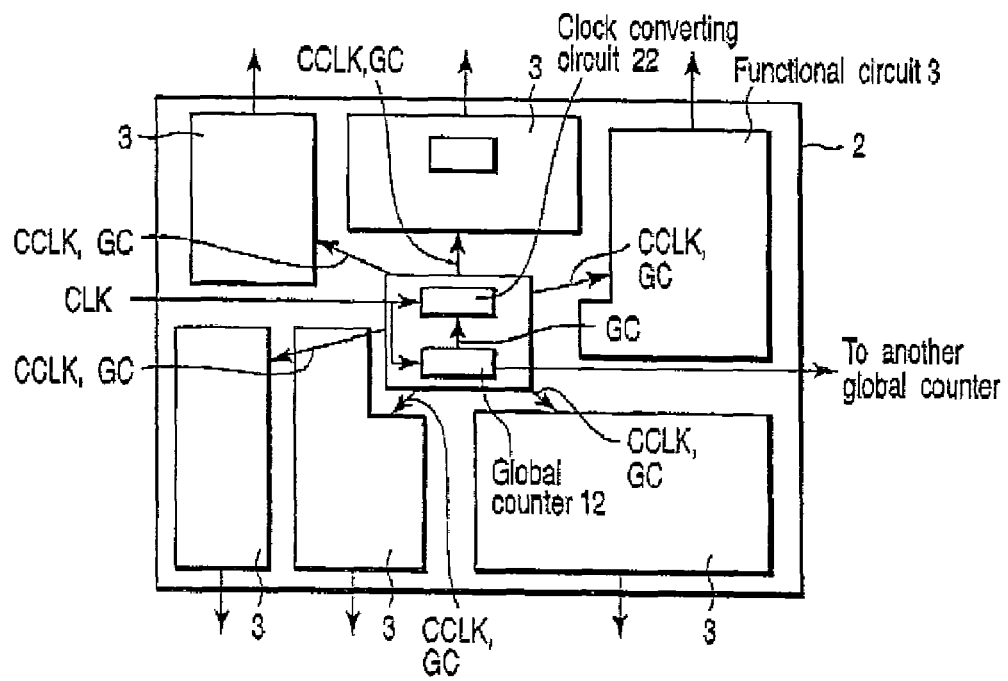
FIG. 7 is a block diagram showing each area according to the second embodiment in further detail.

FIG. 6 is a diagram schematically showing main parts of a semiconductor integrated circuit according to the second embodiment of the present invention. As shown in FIG. 6, an IC chip (semiconductor substrate) 21 is divided into some areas 2. Symbols A to E for the areas 2 indicate that the components in the areas 2 having the same symbol operate in accordance with a clock signal of the same frequency. FIG. 7 is a block diagram showing one area 2 in further detail. Each of the areas 2 has the arrangement shown in FIG. 7 and described below.

As shown in FIGS. 6 and 7, the clock signal CLK is supplied to the global counters 12 in all the areas 2. The clock signal CLK is supplied to all the global counters 12 at the same timing using, for example, the configuration shown in FIGS. 3 and 4. The global counters 12 count the same value in accordance with the timing of the clock signal CLK and supply the counter signal GC to the respective functional circuits 3. The counter signal GC is also supplied to a clock converting circuit 22 described later.

The clock signal CLK is also supplied to the clock converting circuit 22 in each area. The clock converting circuit 22 uses a known method to convert the clock signal CLK into a clock signal CLKb to CLKe of a frequency required for the area to which the clock converting circuit 22 belongs. For example, the clock converting circuit 22 supplied with a clock signal of 2 GHz and provided in the area labeled B generates a clock signal CLKb of 1 GHz from the clock CLK. Consequently, the phase of the clock signal CLKb becomes zero whenever the counter signal GC exhibits zero after two cycles.

Similarly, the clock converting circuit 22 generates, for example, a clock signal CLKc of 750 MHz in the area 2C, a clock signal CLKd of 666 MHz in the area 2D, and a clock signal CLKe of 500 MHz in the area 2E. The phases of the clock signals CLKc to CLKe become zero whenever the counter signal GC exhibits zero after natural number of, for example, 3 or 4 cycles. In the figure, the converted clock signals are collectively shown as CCLK.

The clock signals CLKb to CLKe are supplied to the functional circuits 3 in the respective areas 2. The functional circuits 3 operate in synchronism with the clock signals CLKb to CLKe. The functional areas 3 in the areas 2A operate in synchronism with the clock signal CLKa.

Figure 8:
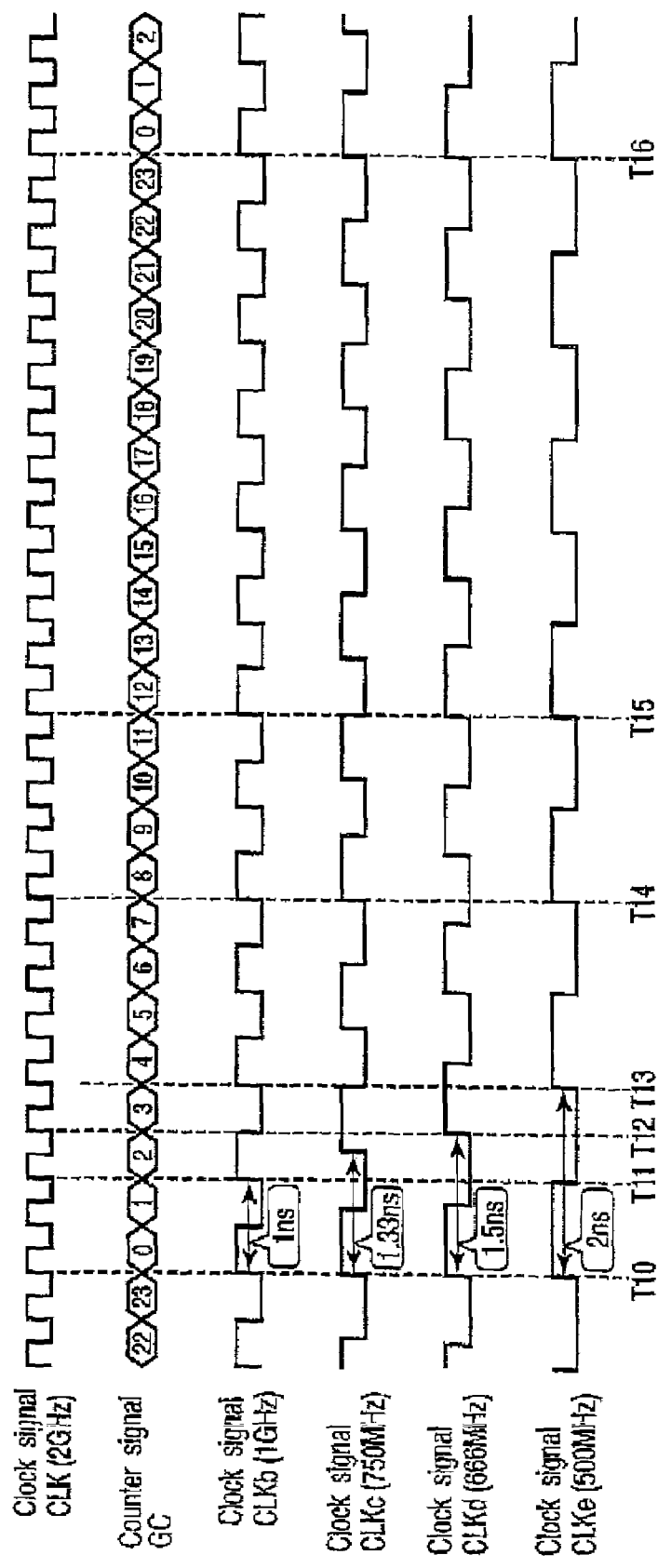
FIG. 8 is a timing chart showing waveforms for main parts of the second embodiment.

Now, with reference to FIG. 8, the operations of the functional circuit will be described in further detail. FIG. 8 is a timing chart showing waveforms for main parts of the semiconductor integrated circuit device according to the second embodiment. As shown in FIG. 8, the clock converting circuit 22 converts the clock signal CLKb to CLKe so that the phase of the clock signal becomes zero when the counter signal GC exhibits zero (timing T10). Thus, every time the number of cycles of the counter signal GC is a multiple of 2 (for example, timing T11), the phase of the clock signal CLK and the phase of the clock signal CLKb with a period double that of the clock signal CLK is zero.

Similarly, every time the number of cycles of the counter signal GC, including a time T12, is a multiple of 3, the phases of the clock signals CLK and CLKc is zero. Further, every time the number of cycles of the counter signal GC, including a time T13, is a multiple of 4, the phases of the clock signals CLK, CLKb, and CLKe is zero. In this manner, every time the number of cycles of the counter signal GC reaches a multiple of a certain value, at least two of the clock signals CLK and CLKb to CLKe are zero. Moreover, whenever the number of cycles of the counter signal GC reaches a multiple of 24, the phases of all the clock signals CLK and CLKb to CLKe are zero. At times T14 to T16, the phase of the clock signal CLK matches those of any of the clock signals CLKb to CLKe.

Thus, each functional circuit 3 simply monitors the value of the counter signal GC and can determine when the phase of its clock signal matches those of other signals. A control section of each functional section 3 pre-stores the frequencies of the clock signals for the other functional circuits 3. Alternatively, each functional circuit 3 exchanges the information with the others immediately after the IC chip 21 has started its operation. Then, the functional circuits 3 transfer data when the phases of their clock signals become zero. Thus, it is possible to execute the synchronous transfer of data, the supply of the reset signal, and the like even between areas that use clock signals having different frequencies.

In the semiconductor integrated circuit device according to the second embodiment of the present invention, the areas 2 are provided with the respective global counters 12 that count the same value at the same timing. The clock signals CLK and CLKb to CLKe for the respective areas 2 synchronize with the corresponding global counters 12. Thus, each functional circuit 3 simply monitors the value of the counter signal GC and can determine the when the phase of its clock signal matches those of clock signals for the other functional circuits 3 even if the clock signals have different frequencies. Consequently, data transmission and reception timings can be easily controlled between areas 2 that use clock signals having different frequencies.

Third Embodiment

A third embodiment relates to the case in which units communicate with one another via a bus.

Figure 9:
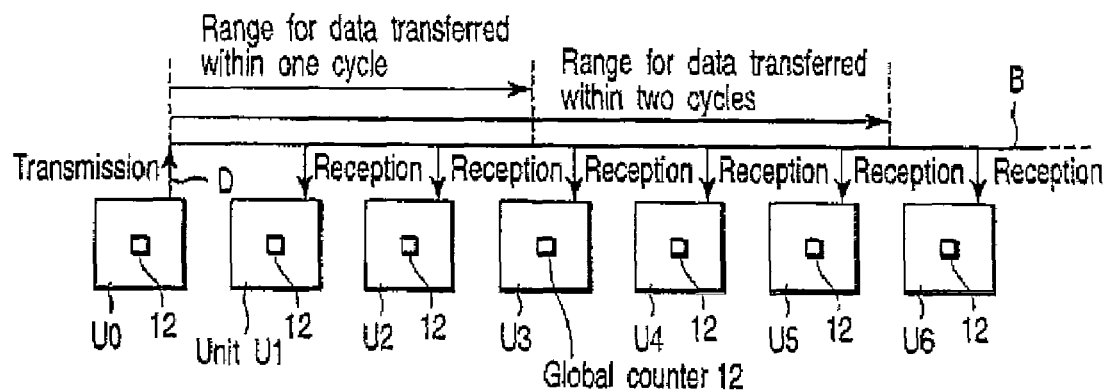
FIG. 9 is a diagram showing a semiconductor integrated circuit device according to a third embodiment of the present invention.
Figure 10:
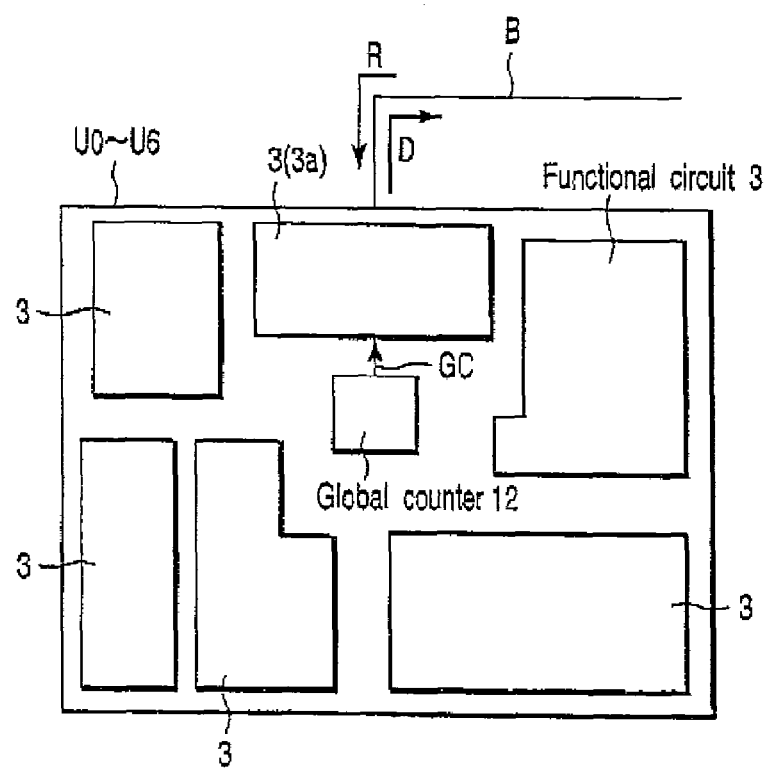
FIG. 10 is a block diagram showing each area according to the third embodiment in further detail.

FIG. 9 schematically shows main parts of a semiconductor integrated circuit device according to the third embodiment of the present invention. As shown in FIG. 9, the semiconductor integrated circuit device is provided with a plurality of units U0 to U6. The units U0 to U6 may be provided on one semiconductor chip or distributed among a plurality of semiconductor chips. Each of the units U0 to U6 performs predetermined operations, signal processing, information storage, and the like. The units U0 to U6 are each composed of various analog elements, logic circuits, a memory, and the like. The units U0 to U6 may be a group of circuits that collectively constitute one functional unit or that are functionally independent of one another. In either case, each of the units U0 to U6 is composed of one or more functional circuits 3 as shown in FIG. 10.

Each of the units U0 to U6 has the global counter 12. All the global counters 12 count the same value at the same timing. A bus B connects the global counters 12 together.

The bus B connects the units U0 to U6 together. In FIG. 9, the bus B is symbolically shown as one line. However, the bus B is actually composed of appropriate number of wires in accordance with amount of data transferred. Alternatively, some units may share one bus B and choose a timing to use when no other units use it or an exclusive bus may be provided for each combination of two units.

Figure 11:
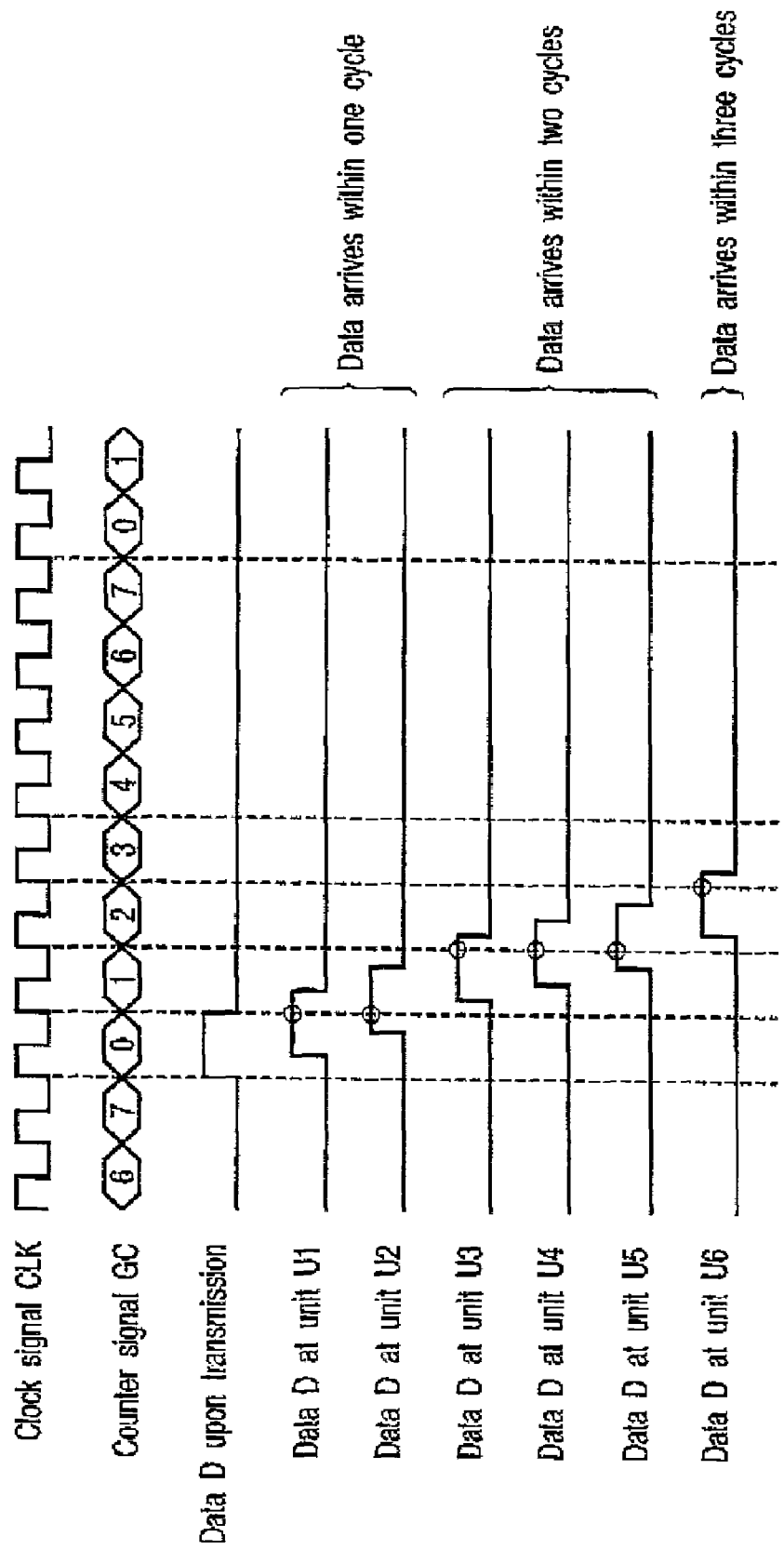
FIG. 11 is a timing chart showing waveforms for main parts of the third embodiment.

Now, the operations of the units U0 to U6 will be described in detail with reference to FIGS. 9 to 11. The units U0 to U6 shift to a measurement mode, for example, when the IC chip is powered on and every fixed time during normal operations. FIG. 11 is a timing chart showing waveforms for main parts of the semiconductor integrated circuit device according to the third embodiment.

As shown in FIG. 9, first, one of the units U0 to U6, for example, the unit U0, operates as a master, while the remaining ones operate as slaves. As shown in FIGS. 9 to 11, the unit U0 transmits measurement data D (for example, pulses) when the counter signal GC exhibits zero. The other units U1 to U6 already know that the unit transits the data D when the counter signal GC exhibits zero.

The transmitted data teaches the units U1 to U6 via the bus B after the elapse of different amounts of time corresponding to the distances between the unit 0 and each of the units U1 to U5. For example, as shown in FIG. 11, the units U1 and U2 receive the data D within one cycle of the counter signal GC after the data transmission. Similarly, the units U3, U4, and U5 receive the data D within two cycles of the counter signal GC after the transmission of the data D. The unit U6 receives the data D within three cycles of the counter signal GC after the transmission of the data D. The units U1 to U6 observes value of the counter signal GC upon receiving the data D and then can determine how many cycles are required to receive the data D. Then, the units U1 to U6 use a signal R to notify the unit U0 how many cycles are required to receive data from the unit U0.

The series of operations are sequentially performed using each of the units U1 to U6 as a master. These operations enable each of the units U0 to U6 to determine the amount of time required for data to reach the other units U0 to U6.

In the prior art, if some units are connected together by a bus and for example, two of these units communicate with each other, the handshake is carried out before the data communication in order to check whether or not the units are ready for transmission or reception. Various known handshake methods have been devised and all these methods need time to complete.

In contrast, according to the present embodiment, each of the units U0 to U6 knows the time amount required for the data transmission between the units. Thus, if any of the units U0 to U6 does not receive a response from another one after the elapse of at least the previously acquired time amount required for the transmission or reception, the transmission can be retried to establish communication. That is, communication errors can be detected without the handshake for each communication. This makes it possible to eliminate the time amount to handshake. The communication control is performed by for example, a communication control section 3a that is one of the functional circuits 3.

Further, when a unit is designed, it is impossible to determine, for example, the connectional relationships with the other units or the lengths of the buses between the units. Nevertheless, the time amount required for data to transfer between the units depends on the distance between the units and the environment for operations (temperature and voltage). It is thus difficult to minimize the communication time while securing the communication between the units.

In contrast, the present embodiment can establish the communication between the units while minimizing the communication time, regardless of how the units U0 to U6 are used. This facilitates the design of the units U0 to U6. Further, shifting each of the units U0 to U6 (communication control section 3a) to the measurement mode regularly can update transmission and reception cycles stored by the units U0 to U6, depending on a change in the environment.

In the semiconductor integrated circuit device according to the third embodiment, the units U0 to U6 have the respective global counters 12 that count the same value at the same timing. Each of the units U0 to U6 stores transmission and reception cycles between itself and each of the other units in association with the value in the global counter 12. The units U0 to U6 can efficiently communicate with one another regardless of the conditions under which the units U0 to U6 are used.

Fourth Embodiment

A fourth embodiment is related to a method for creating clock signals of different frequencies.

Figure 12:
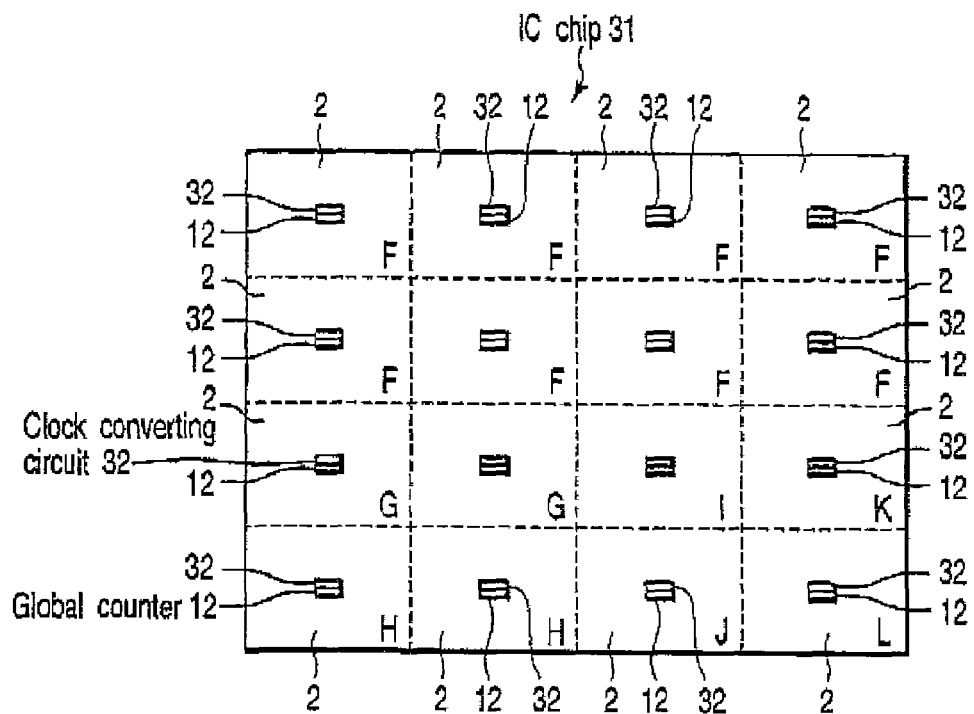
FIG. 12 is a diagram showing a semiconductor integrated circuit device according to a fourth embodiment of the present invention.

FIG. 12 is a diagram showing a semiconductor integrated circuit device according to a fourth embodiment of the present invention. As shown in FIG. 12, an IC chip (semiconductor substrate) 31 is divided into some areas 2. Symbols F to L for the respective areas 2 indicate that the components in the areas 2 having the same symbol operate in accordance with a clock signal of the same phase and the same frequency.

The functional circuits 3 in the areas 2 labeled F operate in accordance with the clock signal CLK of for example, 2 GHz. The functional circuits 3 in the areas labeled G and H operate in accordance with clock signals of a frequency (for example, 1 GHz) half that of the clock signal CLK. The phase of the clock signal for the areas labeled G is offset, by 180°, from that of the clock signal for the areas labeled H.

Similarly, the functional circuits 3 in the areas labeled I, J, K, and L operate in accordance with clock signals of a frequency (for example, 500 MHz) a quarter that of the clock signal CLK. The phase of each of the clock signals for the areas labeled I, J, K, and L is advanced compared with the clock signal for the areas denoted by the succeeding symbol by 90°.

Figure 13:
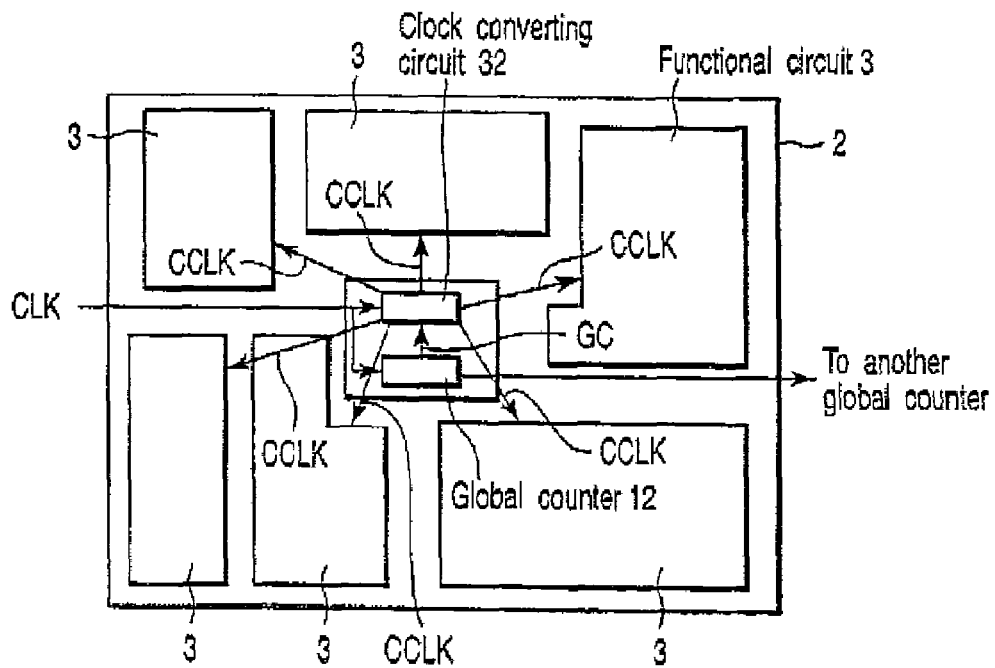
FIG. 13 is a block diagram showing each area according to the fourth embodiment in further detail.

FIG. 13 is a block diagram showing one area 2 according to the fourth embodiment in further detail. Each area 2 has the arrangement shown in FIG. 13 and described below.

As shown in FIGS. 12 and 13, the clock signal CLK is supplied to the global counters 12 in the areas 2. The clock signal CLK is supplied to all the global counters 12 at the same timing using, for example, the configuration shown in FIGS. 3 and 4. The global counters 12 count the same value at the same timing in accordance with the clock signal CLK. The global counters 12 then supply the counter signal GC to respective clock converting circuits 32 described later. According to the present embodiment, the counter signal GC is composed of for example, two bits.

Each of the clock converting circuits 32 generates, from the clock signal CLK and counter signal GC, a clock signal CLKf to CLKl of a frequency required for the area 2 to which the clock converting circuit 32 belongs. Accordingly, the clock converting circuits 32 have different configurations in accordance with the frequencies and phases of the clock signals CLKf to CLKl to be generated.

Now, a specific example of the clock converting circuit 32 will be described with reference to FIGS. 14 to 20. Each of FIGS. 14 to 19 shows one of the clock converting circuits 32 according to the fourth embodiment which is provided in the area labeled G, H, I, J, K, or L, respectively. FIG. 20 is a timing chart showing waveforms for main parts of the fourth embodiment. Each of the clock signals CLKg to CLKl goes high every time the counter signal GC and clock signals CLK of predetermined values are supplied.

Figure 14:
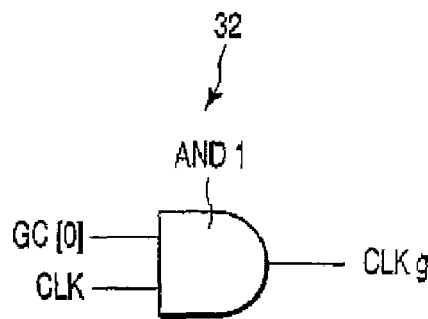
FIGS. 14, 15, 16, 17, 18 and 19 are diagrams showing a clock converting circuit according to the fourth embodiment.

As shown in FIG. 14, the clock converting circuit 32 in the area 2 labeled G is implemented using an AND circuit AND1. The AND circuit AND1 is supplied with a signal GC[0] indicating the least significant one bit of the counter signal, as well as the clock signal CLK. Accordingly, as shown in FIG. 20, the AND circuit AND1 outputs the clock signal CLKg, which remains high while the least significant one bit of the counter signal GC is 1 and while the clock signal CLK remains high. The clock signal CLKg has a frequency half that of the clock signal CLK.

Figure 15:
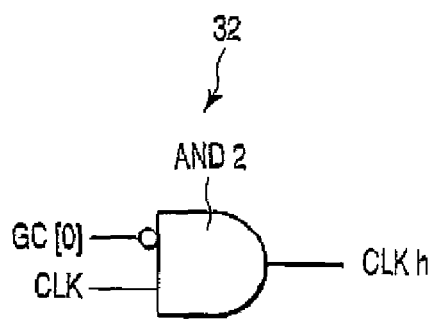

As shown in FIG. 15, the clock converting circuit 32 in the area 2 labeled H is implemented using an AND circuit AND2. The AND circuit AND2 is supplied with the inverted signal GC[0] as well as the clock signal CLK. Accordingly, as shown in FIG. 20, the AND circuit AND2 outputs the clock signal CLKh, which remains high while the least significant one bit of the counter signal GC is 0 and while the clock signal CLK remains high. The clock signal CLKh rises at the same frequency as the clock signal CLKg and in a phase offset from that of the clock signal CLKg by 180°.

Figure 16:
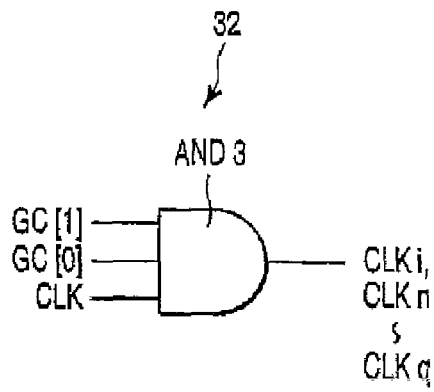

As shown in FIG. 16, the clock converting circuit 32 in the area 2 labeled I is implemented using an AND circuit AND3. The AND circuit AND3 is supplied with a signal GC[1] indicating the most significant one bit of the counter signal, as well as the signal GC[0] and the clock signal CLK. Accordingly, as shown in FIG. 20, the AND circuit AND3 outputs the clock signal CLKi, which remains high while the bit sequence of the counter signal GC is "11" and while the clock signal CLK remains high. The clock signal CLKi has a frequency a quarter that of the clock signal CLK.

Figure 17:
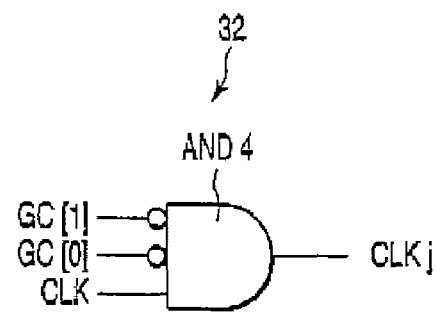

As shown in FIG. 17, the clock converting circuit 32 in the area 2 labeled J is implemented using an AND circuit AND4. The AND circuit AND4 is supplied with the inverted signal GC[1], the inverted signal GC[0], and the clock signal CLK. Accordingly, as shown in FIG. 20, the AND circuit AND4 outputs the clock signal CLKj, which remains high while the bit sequence of the counter signal GC is "00" and while the clock signal CLK remains high. The clock signal CLKj rises at the same frequency as the clock signal CLKi and in a phase advanced compared with the clock signal CLKi by 90°.

Figure 18:
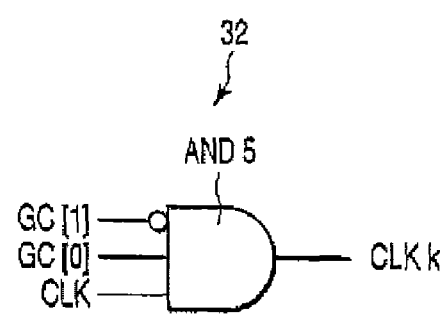

As shown in FIG. 18, the clock converting circuit 32 in the area 2 labeled K is implemented using an AND circuit AND5. The AND circuit AND5 is supplied with the inverted signal GC[1], the signal GC[0], and the clock signal CLK. Accordingly, as shown in FIG. 20, the AND circuit AND5 outputs the clock signal CLKk, which remains high while the bit sequence of the counter signal GC is "01" and while the clock signal CLK remains high. The clock signal CLKk rises at the same frequency as the clock, signal CLKj and in a phase advanced compared with the clock signal CLKj by 90°.

Figure 19:
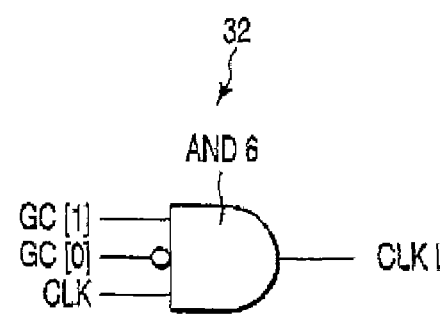
Figure 20:
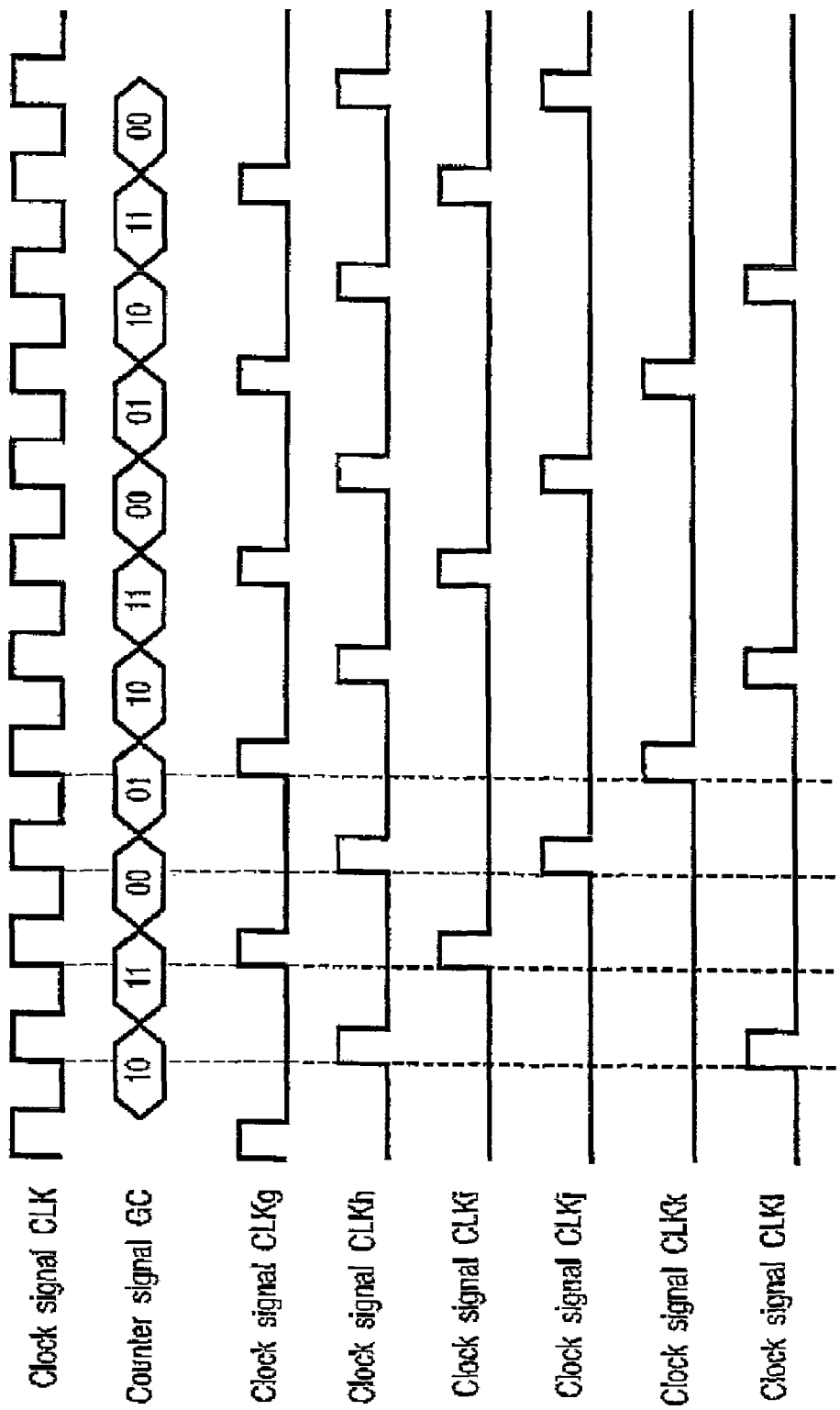
FIG. 20 is a timing chart showing waveforms for main parts of the fourth embodiment.

As shown in FIG. 19, the clock converting circuit 32 in the area 2 labeled L is implemented using an AND circuit AND6. The AND circuit AND6 is supplied with the signal GC[1], the inverted signal GC[0], and the clock signal CLK. Accordingly, as shown in FIG. 20, the AND circuit AND6 outputs the clock signal CLKl, which remains high while the bit sequence of the counter signal GC is "10" and while the clock signal CLK remains high. The clock signal CLKl rises at the same frequency as the clock signal CLKk and in a phase advanced compared with the clock signal CLKk by 90°.

In the semiconductor integrated circuit device according to the fourth embodiment of the present invention, the areas 2 are provided with the respective global counters 12 that count the same value at the same timing. The clock signal CLK for each area 2 is generated by supplying the logic circuit with the counter signal GC and clock signal CLK from the global counter 12. Thus, even if the functional circuits 3 operate in accordance with the clock signals CLK and CLKg to CLKl of different frequencies, the variation in the time at which the clock signal CLK or CLKg to CLKl reaches the functional circuit 3 is at most equal to that which may occur when the clock signal CLK is distributed to the areas 2. This reduces factors to be considered in the design of the functional circuits 3, thus facilitating the design.

FIFTH EMBODIMENT

A fifth embodiment relates to generating clock signals with different phases using global counters that count different values.

Figure 21:
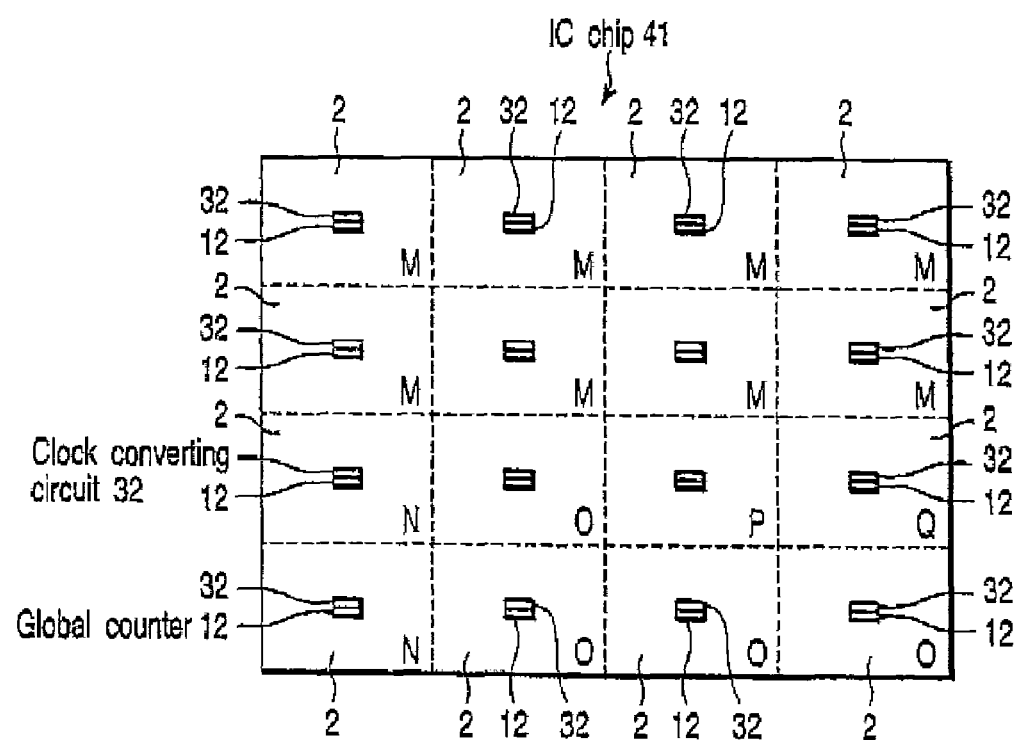
FIG. 21 is a diagram showing a semiconductor integrated circuit device according to a fifth embodiment of the present invention.

FIG. 21 is a diagram showing a semiconductor integrated circuit device according to the fifth embodiment of the present invention. As shown in FIG. 21, an IC chip (semiconductor substrate) 41 is divided into some areas 2. Symbols M to Q for the respective areas 2 indicate that the components in the areas 2 having the same symbol operate in accordance with a clock signal of the same phase and the same frequency.

The functional circuits 3 in the areas 2 labeled M operate in accordance with the clock signal CLK of for example, 2 GHz. The functional circuits 3 in the areas labeled N, O, P, and Q operate in accordance with clock signals of a frequency (for example, 500 GHz) a quarter that of the clock signal CLK. The phase of the clock signal for the areas denoted by any of the symbols N, O, P, and Q is offset, by 90°, from that of the clock signal for the areas denoted by the succeeding symbol.

Each area 2 has the arrangement shown in FIG. 13 and described below. However, the value in the global counter 12 consists of two bits and varies with the areas 2 as described later. The timing for the count is the same. The clock converting circuit 32 in each area 2 has the configuration shown in FIG. 16. The clock converting circuits 32 output clock signals CLKn to CLKq with different phases in accordance with the clock signals CLK corresponding to the areas 2.

Figure 22:
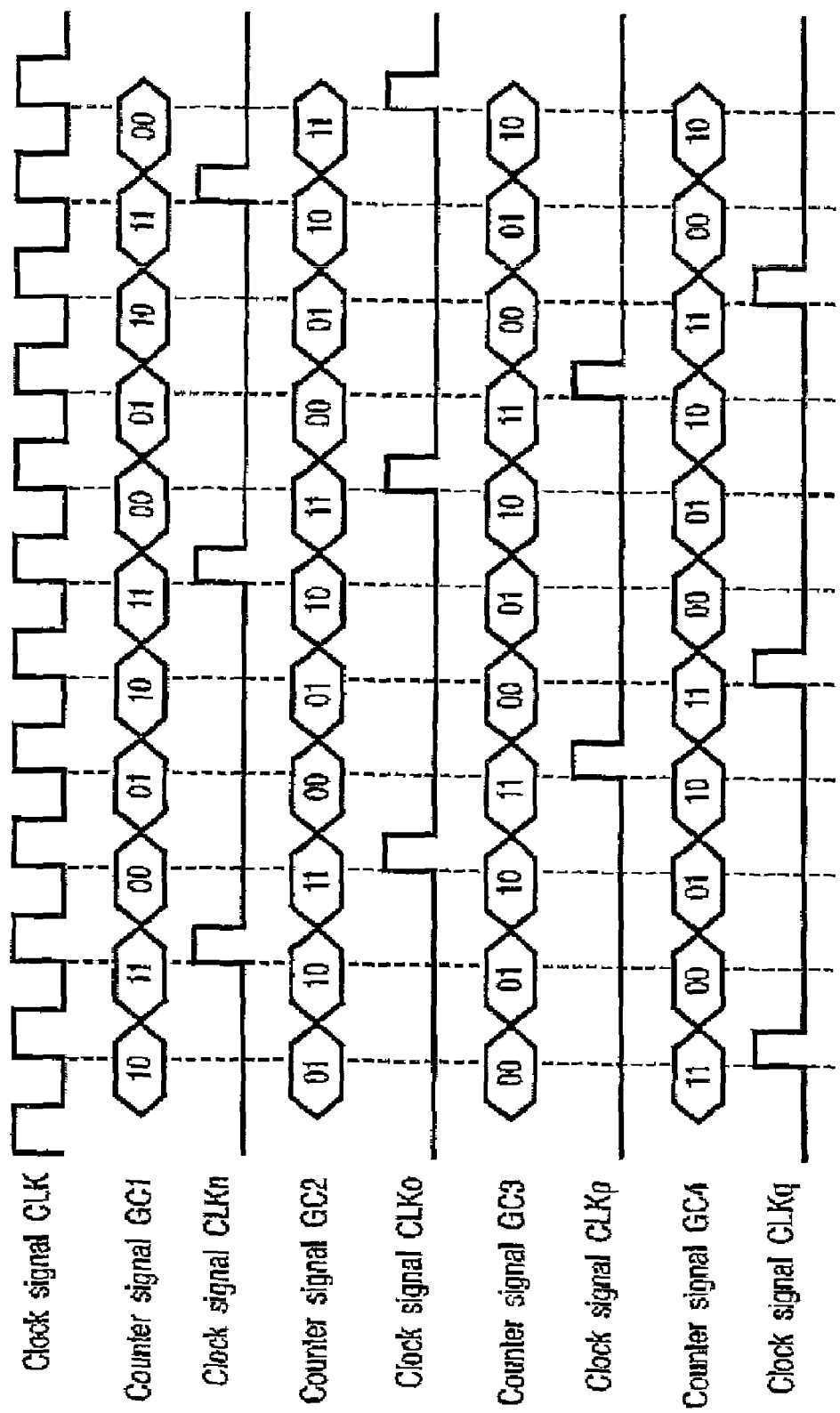
FIG. 22 is a timing chart showing waveforms for main parts of the fifth embodiment.

FIG. 22 is a timing chart showing waveforms for main parts of the fifth embodiment. As shown in FIG. 22, the values in counter signals GC1 to GC4 in the areas 2 labeled N, O, P, and Q differ from one another and decrease in order of N, O, P, and Q. In each area 2, the corresponding one of the counter signals GC1 to GC4 is supplied to the clock converting circuit 32, shown in FIG. 16. Thus, each clock converting circuit 32 outputs the corresponding one of the clock signals CLKn to CLKq while the corresponding one of the counter signals GC1 to GC4 has a value of "11" and which the clock signal CLK remains high. Accordingly, as shown in FIG. 22, the frequencies of the clock signals CLKn to CLKq are a quarter of that of the clock signal CLK. The phase of the clock signal denoted by one of CLKn to CLKq is advanced, by 90°, compared with the clock signal denoted by the succeeding symbol.

In the semiconductor integrated circuit device according to the fifth embodiment of the present invention, the areas 2 are provided with the respective global counters 12 that count a value at the same timing. The clock signal CLKn to CLKq for each area is generated by supplying the logic circuit with the counter signal GC and clock signal CLK from the global counter 12. Then, by configuring the logic circuits in the respective areas in the same manner and varying the values in the global counters 12, it is possible to generate clock signals CLKn to CLKq with different phases and the same frequency. The variation in timing for the clock signal CLK and CLKg to CLKl among the areas 2 is at most equal to that which may occur when the clock signal CLK is distributed to the areas 2. This reduces the factors to be considered in the design of the functional circuits 3, thus facilitating the design.

Sixth Embodiment

A sixth embodiment can be used in addition to each of the above embodiments and relates to the control of the clock signal.

Figure 23:
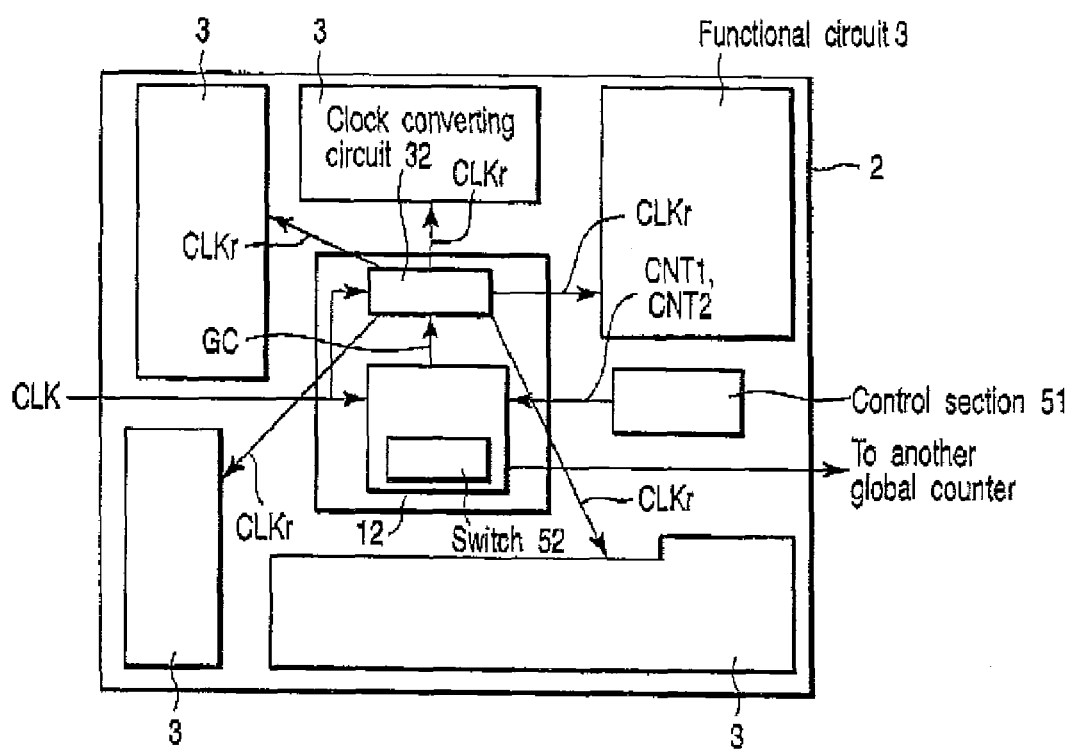
FIG. 23 is a diagram showing a semiconductor integrated circuit device according to a sixth embodiment of the present invention.

FIG. 23 is a diagram showing a part of a semiconductor integrated circuit device according to the sixth embodiment of the present invention. FIG. 23 shows the area 2. As shown in FIG. 23, a control section 51 is provided for each global counter 12. The control section 51 outputs control signals CNT1 and CNT2. The control signals CNT1 and CNT2 are supplied to the global counter 12. A counter section 52 of the global counter 12 is supplied with the control signal CNT1. The control section 52 can change the value in the global counter 12 in accordance with the contents of the signal CNT1.

The global counter 12 has a switch section, for example, a transistor, in its output stage. The switch section 52 is turned on or off in accordance with the control signal CNT2 to output or stop the counter signal. For example, the clock converting circuit 32 has the configuration shown in FIG. 16.

Figure 24:
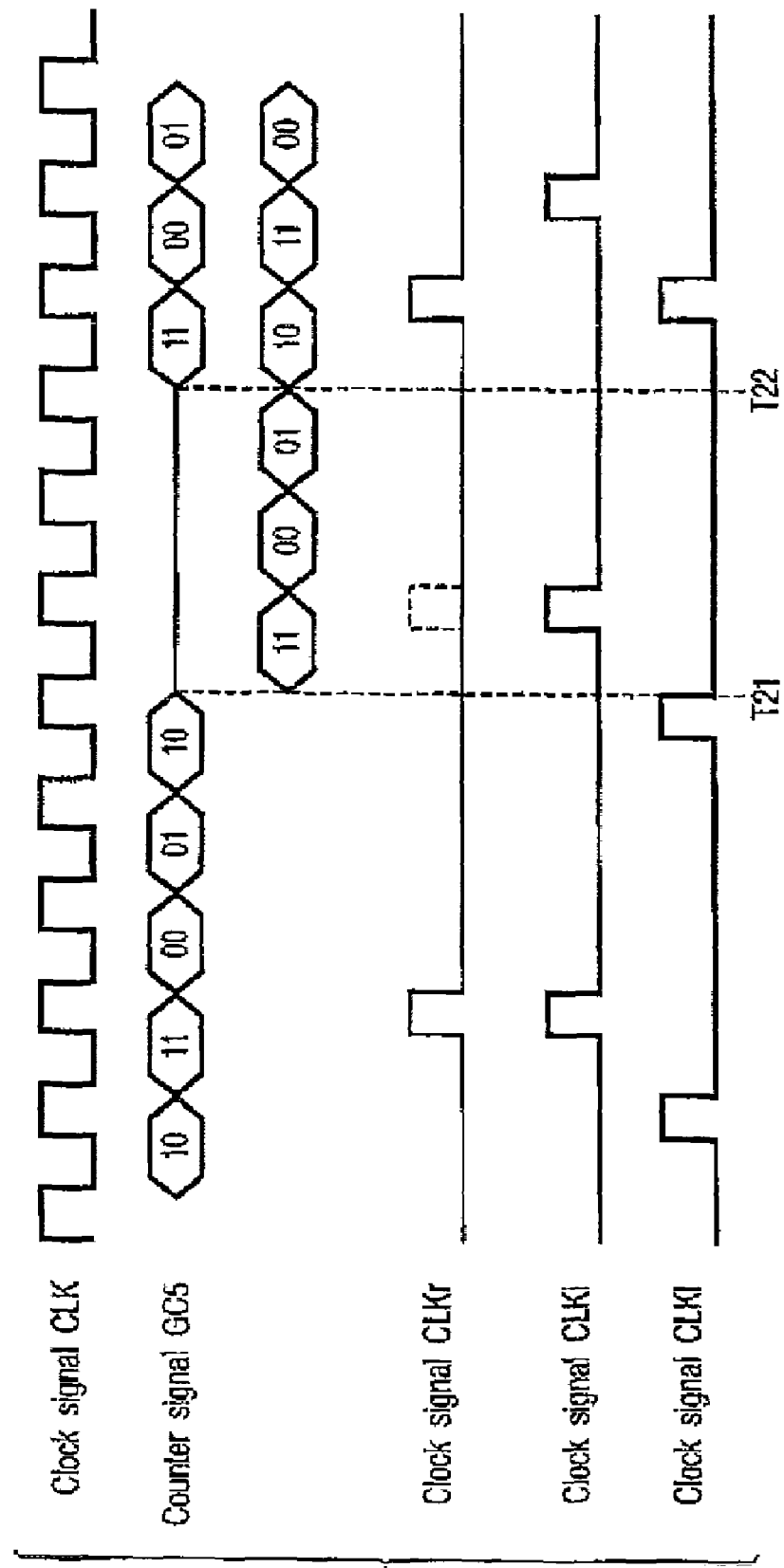
FIG. 24 is a timing chart showing waveforms for main parts of the sixth embodiment.

FIG. 24 is a timing chart showing waveforms for main parts of the sixth embodiment. The clock converting circuit 32 is supplied with the signals GC[0] and GC[1] and the clock signal CLK. Accordingly, as shown in FIG. 24, the clock converting circuit 32 outputs a clock signal CLKr that remains high while the counter signal GC5 has a value of "11" and while the clock signal CLK remains high.

At a time T21, the counter section 52 is supplied with the control signal CNT1 indicating that the output of the counter signal GC5 is to be stopped. As a result, the output of the counter signal GC5 is stopped. Thus, the clock signal CLKr from the clock converting circuit 32 does not go high.

Then, at a time T22, the counter section 52 is supplied with the control signal CNT1 indicating that the output of the counter signal GC5 is to be started. As a result, the output of the counter signal GC5 is resumed. While the output of the counter signal GC5 is at a stop, the control signal CNT2 can rewrite the value of the counter signal GC5 so that the phase of the clock signal CLKr after the resumption of the output of the counter signal GC5 differs from that of the clock signal CLKr before the stoppage of the output of the counter signal GC5. The phase of the clock signal CLKr before the stoppage of the output of the counter signal GC5 matches the clock signal CLKi.

The value counted by the clock signal CLKr when the output of the counter signal GC5 is resumed is set to "10", which would be "11" if the counting had been continued since before the stoppage. Accordingly, the phase of the clock signal CLKr after the resumption differs from that of the clock signal CLKr before the stoppage and is the same as the clock signal CLKl. Therefore, by resuming the counting with the counter signal GC5 at an appropriate value, it is possible to control the phase of the clock signal CLKr upon the resumption.

On the other hand, if the value of the counter signal CNT2 is not changed using the control signal CNT2 upon the resumption, the counter section 52 continues the count even while the output of the counter signal GC is at a stop. Then, once the output of the counter signal GC resumes, a value is output which has been continuously counted since the stoppage.

The control signal CNT2 may be used to cause the counter signal GC5 to keep counting the same value. By setting the count to any value other than "11", it is possible to keep the clock signal CLKr low during the supply of this value.

With the semiconductor integrated circuit device according to the sixth embodiment of the present invention, the clock signal CLKr for each area 2 is generated by supplying the logic circuit with the clock signal CLK and the counter signal GC from the corresponding one of the global counters 12 for the respective areas 2 that carry out the counting at the same timing. Then, setting the counter signal GC5 to an appropriate value makes it possible to stop or resume the output of the clock CLKr or control the phase of the clock CLKr.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A semiconductor integrated circuit device comprising:
   a semiconductor substrate having a first area and a second area;
   a plurality of counters one of which is provided in the first area and the second area and which cyclically count a same value at a same timing in synchronism with a first clock signal and output a counter signal as a result of counting;
   a first clock circuit provided in the first area, supplied with a first counter signal from the one of the counters in the first area and outputting a second clock signal having a phase which becomes zero every time the first counter signal counts n times (n being a natural number);
   a first circuit provided in the first area and operating in synchronism with the second clock signal;
   a second clock circuit provided in the second area, supplied with a second counter signal from the one of the counters in the second area and outputting a third clock signal having a phase which becomes zero every time the second counter signal counts m times (m being a natural number different from n); and
   a second circuit provided in the second area, operating in synchronism with the third clock signal and supplying the first circuit with data when the first and second counter signals have a value equal to a common multiple of n and m.

2. The device according to claim 1, wherein the first area is equal to a range that the second clock signal from the first clock circuit travels within one cycle of the first clock signal.

3. The device according to claim 1, further comprising:
   a clock source outputting a clock signal;
   a plurality of buffers each of which is supplied by the clock source with the clock signal via a signal line which communicates a signal within one cycle of the clock signal and each of which distributes the clock signal to a plurality of areas including the first area and the second area via a signal line which communicates a signal within one cycle of the clock signal, and
   wherein the plurality of counters count in synchronism with the clock signal supplied by the buffer.

4. A semiconductor integrated circuit device comprising:
   a semiconductor substrate having a first area, a second area and a third area;
   a plurality of counters one of which is provided in the first area, the second area and the third area, and which cyclically count a same value at a same timing and output a counter signal as a result of counting;
   a first circuit provided in the first area, supplied with a first counter signal from the one of the counters in the first area and outputting a first signal when the first counter signal has a first value;
   a second circuit provided in the second area, supplied with a second counter signal from the one of the counters in the second area and supplying the first circuit with a second signal containing information on a value of the second counter signal obtained upon reception of the first signal;
   a third circuit provided in the third area, supplied with a third counter signal from the one of the counters in the third area and supplying the first circuit with a third signal containing information on a value of the third counter signal obtained upon reception of the first signal;
   the second circuit outputs a fourth signal when the second counter signal has a second value,
   the first circuit supplies the second circuit with a fifth signal containing information on a value of the first counter signal obtained upon reception of the fourth signal, and
   the third circuit supplies the second circuit with a sixth signal containing information on a value of the third counter signal obtained upon reception of the fourth signal.

* * * * *